(12) United States Patent
Proctor et al.

(10) Patent No.: US 8,600,914 B2
(45) Date of Patent: Dec. 3, 2013

(54) LEFT AND RIGHT UNLINKING FOR A SHARED KNOWLEDGE BASE

(75) Inventors: Mark Proctor, London (GB); Edson Tirelli, Montreal (CA)

(73) Assignee: Red Hat, Inc., Raleigh, NC (US)

( * ) Notice: Subject to any disclaimer, the term of this patent is extended or adjusted under 35 U.S.C. 154(b) by 394 days.

(21) Appl. No.: 12/957,099

(22) Filed: Nov. 30, 2010

(65) Prior Publication Data

US 2012/0136811 A1    May 31, 2012

(51) Int. Cl.
*G06N 5/02* (2006.01)

(52) U.S. Cl.
USPC .......................................................... 706/10

(58) Field of Classification Search
None
See application file for complete search history.

(56) References Cited

U.S. PATENT DOCUMENTS

| | | | |
|---|---|---|---|
| 2003/0229605 A1* | 12/2003 | Herrera et al. | 706/47 |
| 2009/0287617 A1* | 11/2009 | Schmidt | 706/10 |

OTHER PUBLICATIONS

Sohn, A and J-L Gaudiot. "Performance Evaluation of the Multiple root node approach to the Rete pattern matcher for production systems" in Proc. FGCS, 1992, pp. 977-984.*
Madden, "Optimising RETE for Low-Memory, Multi-Agent Systems," in Proceedings of Game-On 2003: 4th International Conference on Intelligent Games and Simulation, London, Nov. 2003, pp. 77-81.*
Zhou, Fu, Zhong, Zhao, "The RETE Algorithm Improvment and Implementation," IEEE 2008 International Conference on Information Management, Innovation Management, and Industrial Engineering, 2008, pp. 426-429.*
Ohn, A and J-L Gaudiot. "Performance Evaluation of the Multiple root node approach to the Rete pattern matcher for production systems" in Proc. FGCS, 1992, pp. 977-984.*

* cited by examiner

*Primary Examiner* — Kakali Chaki
*Assistant Examiner* — Walter Hanchak
(74) *Attorney, Agent, or Firm* — Lowenstein Sandler LLP (57) ABSTRACT

Some embodiments of implementing left and right unlinking for a shared knowledge base in an exemplary rule engine have been presented. A rule engine can create a network to evaluate a set of rules in a knowledge base. The network includes at least one multiple-input node, such as a beta node having two inputs. The rule engine may process data in multiple sessions simultaneously using the network. The rule engine may further logically unlink a first node in the network from a second node in the network for a first session while keeping the first node linked to the second node for a second session.

21 Claims, 9 Drawing Sheets

LEFT AND RIGHT UNLINKING FOR A SHARED KNOWLEDGE BASE

TECHNICAL FIELD

Embodiments of the present invention relate to artificial intelligence, and more specifically to rule engines.

BACKGROUND

Figure 1:
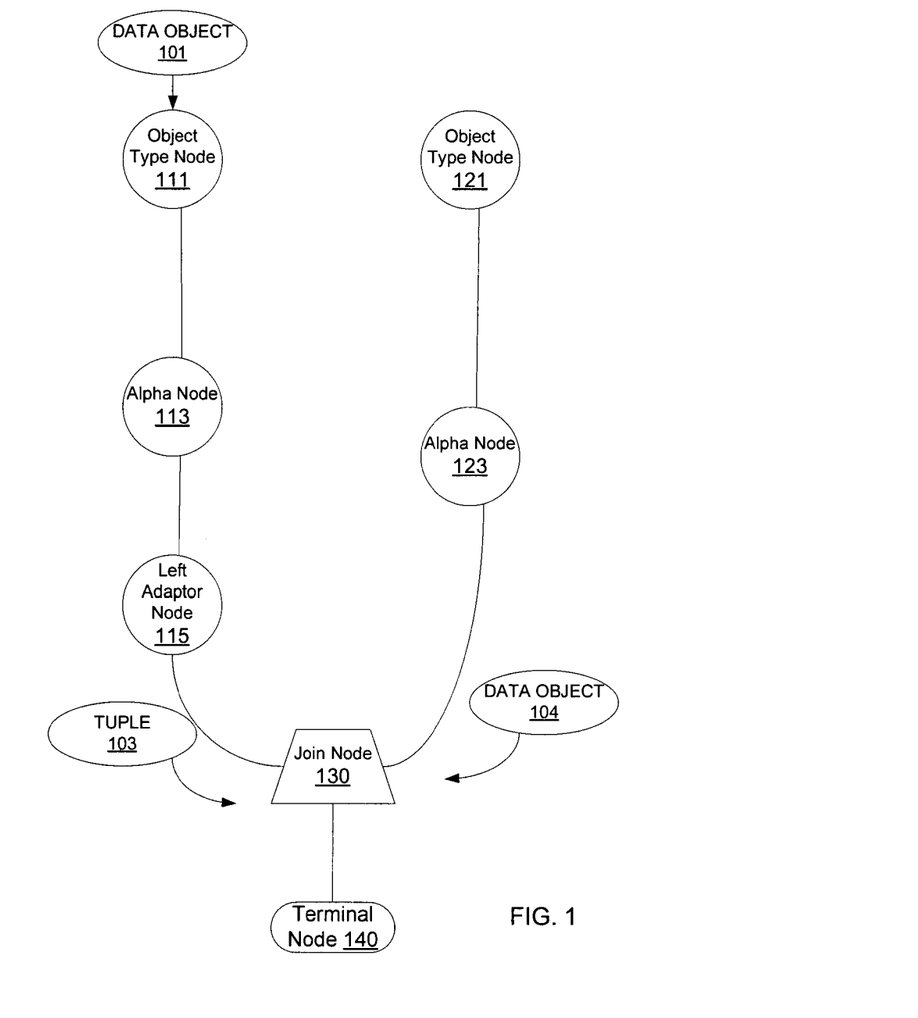
FIG. 1 illustrates a conventional Rete network.

The development and application of rule engines is one branch of Artificial Intelligence (A.I.), which is a very broad research area that focuses on "making computers think like people." Broadly speaking, a rule engine processes information by applying rules to data objects (also known as facts; or simply referred to as data). A rule is a logical construct for describing the operations, definitions, conditions, and/or constraints that apply to some predetermined data to achieve a goal. Various types of rule engines have been developed to evaluate and process rules. Conventionally, a rule engine implements a network to process rules and data objects, such as the example shown in FIG. 1. A network may include many different types of nodes, including, for example, object-type nodes, alpha nodes, left-input-adapter nodes, eval nodes, join nodes, not nodes, and terminal nodes, etc. Referring to FIG. 1, the network 100 includes two object-type nodes 111 and 121, two alpha nodes 113 and 123, a left-input-adapter node 115, a join node 130, and a terminal node 140.

Typically, data objects enter a network at the root node, from which they are propagated to any matching object-type nodes. From an object-type node, a data object is propagated to either an alpha node (if there is a literal constraint), a left-input-adapter node (if the data object is the left most object type for the rule), or a beta node (such as a join node). For example, referring to FIG. 1, a data object 101 is propagated to a matching object-type node 111. From the Object-Type Node 111, the data object 101 is propagated to an alpha node 113, and then to a left-input-adapter node 115. Connected to the left-input-adapter node 115 is a join node 130, which is an example of a beta node.

A beta node has two inputs, unlike one-input nodes, such as object-type nodes and alpha nodes. A beta node can receive tuples in its left-input and data objects, or simply referred to as objects, in its right-input. Join nodes, not nodes, and exist nodes are some examples of beta nodes. All nodes may have one or more memories to store a reference to the data objects and tuples propagated to them, if any. For example, a beta node can have a left memory and a right memory associated with its left input and right input, respectively. The left-input-adapter node creates a tuple with a single data object and propagates the tuple created to the left input of the first beta node connected to the left-input-adapter node, where the tuple is placed in the left memory of the beta node and then join attempts are made with all the objects in the right memory of the beta node. For example, the left-input-adapter node 115 creates a tuple 103 from the data object 101 and propagates the tuple to the join node 130. When the tuple 103 propagates into the join node 130, the tuple 103 is placed in the left memory of the join node.

When another data object 104 enters the right input of the join node, the data object 104 is placed in the right memory of the join node 130 and join attempts are made with all the tuples (including tuple 103) in the left memory of the join node 130. The tuples placed in the left memory of the join node 130 are partially matched. If a join attempt is successful, the data object 104 is added to the tuple 103, which is then propagated to the left input of the next node in the network 100. Such evaluation and propagation continue through other nodes down the network 100, if any, until the tuple 103 reaches the terminal node 140. When the tuple 103 reaches the terminal node 140, the tuple 103 is fully matched. At the terminal node 140, an activation is created from the fully matched tuple 103 and the corresponding rule. The activation is placed onto an agenda of the rule engine for potential firing or potential execution.

As mentioned above, join attempts are made with all the tuples (including tuple 103) in the left memory of the join node 130 when the data object 104 is placed into the right memory of the join node 130. However, if there are no tuples in the left memory, then no join can happen and the data object 104 just waits in the right memory until a tuple propagates to the left input and attempts to join with it. Likewise, the tuple 103 in the left memory would have to wait for data objects to propagate into the right input if the right memory had been empty. It would have been better if the rule engine could avoid populating the join node's memory until both sides have tuples and/or data objects. Conventional left and right unlinking attempts to solve the above problem.

According to one conventional approach, a node can either be left unlinked or right unlinked, but not both, as then the node would be completely disconnected from the network. Unlinking an input means that it may not receive any propagation and that the node's memory for that input will not be populated, thus saving memory space. When the opposite side, which is still linked, receives a propagation (such as a tuple or a data object), the unlinked side is linked back in and, as a result, receives all the tuples or data objects that would have propagated to the memory of the unlinked side. As both sides cannot be unlinked, a simple heuristic approach is proposed for choosing which side to unlink. Specifically, whichever side becomes empty first will cause the opposite side to be unlinked in a node. This conventional approach proposes to simply arbitrarily choose to unlink one side as default upon start up. However, if the wrong side is chosen, an initial hit on performance may be incurred.

BRIEF DESCRIPTION OF THE DRAWINGS

The present invention is illustrated by way of example, and not by way of limitation, in the figures of the accompanying drawings and in which.

DETAILED DESCRIPTION

Described herein are some embodiments of left and right unlinking for a shared knowledge base in a rule engine. In general, a rule engine processes data by evaluating data against a set of rules. Typically, the set of rules are in a rule file, which can be compiled and executed by a rule engine. A runtime representation of the rule file is commonly referred to as a rulebase, which can also be referred to as a knowledge base.

In some embodiments, the rule engine builds a network, such as a Rete network, to implement the rules. Some rules that share similar conditions may share one or more nodes in the network. Furthermore, the rule engine may run multiple sessions to process data simultaneously in the network. As such, the session data is decoupled from the knowledge base to allow sharing of the knowledge base. In such a shared system, a node input that is empty for one session might not be empty for another session. Therefore, if a node input is physically unlinked for one session, such unlinking may cause an error for another session in which the same node input is non-empty. Instead of physically unlinking the node input, the node input is logically unlinked for a specific session in some embodiments, without affecting other sessions sharing or using the same node. For instance, a link indicator can be used in the session's node memory of this node to indicate if the node input is unlinked for a particular input. Using this approach, when a propagating node attempts to propagate a tuple to a receiving node, instead of just creating a left or right tuple and pushing the tuple into the receiving node, the propagating node would have to first retrieve the receiving node's node memory associated with the session of interest to determine if the receiving node is linked on both inputs in the session of interest. If the receiving node is linked on both inputs in the session of interest, then the propagating node may create the tuple and propagate it to the receiving node. Otherwise, the receiving node cannot further evaluate the tuple in the session of interest anyway, and hence, it would have been a waste of resource for the propagating node to create the tuple. Furthermore, because the input is logically unlinked, but not physically unlinked, it is possible to logically unlink both inputs to a node in a session simultaneously without actually physically disconnecting the node from the network, unlike the conventional heuristic approach discussed above. However, excessive linking and unlinking may create the opposite effect instead. Churn can occur in a rule engine when a node with a large amount of right input memory is substantially continually caused to be linked in and unlinked because the node has to be repeatedly populated. This can lead to a slow down of the rule engine. To reduce churn, a time limit may be imposed before allowing the rule engine to unlink the same node again. More details of some embodiments of linking and unlinking for a shared knowledge base of a rule engine are described below.

Figure 2:
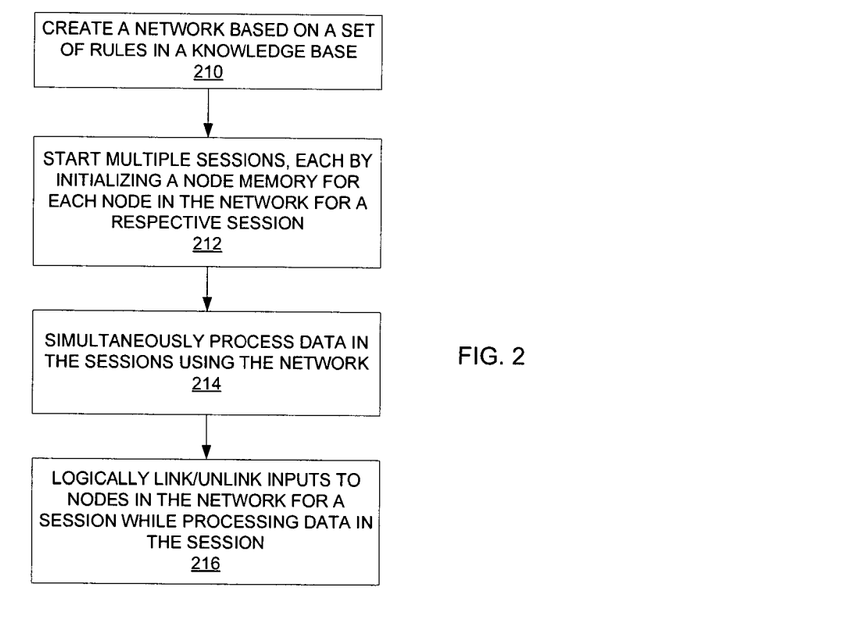
FIG. 2 illustrates one embodiment of a method to incorporate left and right unlinking in a network for a shared knowledge base.

FIG. 2 illustrates one embodiment of a process for a rule engine to incorporate left and right unlinking in a network for a shared knowledge base. Initially, the rule engine creates a network having multiple nodes based on a set of rules of a knowledge base (processing block 210). The nodes may include different types of nodes (such as beta nodes and alpha nodes), and are connected to each other in the network such that data can be propagated from one node to another through the network. The set of rules may be provided by a user of the rule engine. For example, in a business application, the set of rules includes business rules pertaining to business transactions (e.g., medical insurance claim processing, mortgage application, etc.). In some embodiments, the network is a Rete network. Though the techniques disclosed herein can be applied to other types of networks as well.

In some embodiments, the rule engine starts multiple sessions to process data using the network (processing block 212). Note that the sessions can be run simultaneously to share the knowledge base, and hence, sharing at least part of the network. In other words, a node in the network may be shared by multiple sessions. When a session is started, a node memory for each node in the network is initialized for the respective session. The node memory may be stored in a storage device having one or more machine-readable storage media, accessible by the rule engine. Details of one embodiment of a node memory are shown in FIG. 3.

Figure 3:
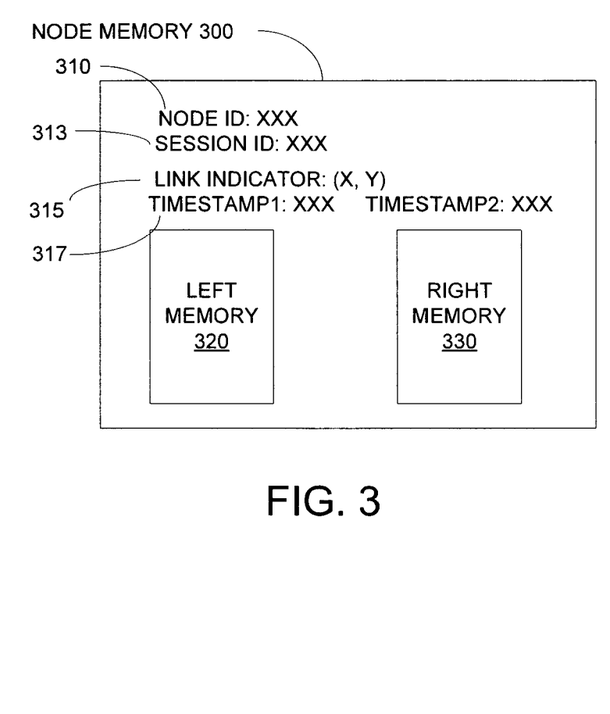
FIG. 3 illustrates one embodiment of a node memory.

Referring to FIG. 3, one embodiment of a node memory 300 may include a node identifier 310, a session identifier 313 to associate the node memory with the respective node and session, a link indicator 315, and two timestamps 317. For beta nodes having two inputs, each node memory 300 further includes a left memory 320 associated with a left input to the beta node, and a right memory 330 associated with a right input to the beta node. In general, data objects propagating to the right input can be temporarily stored in the right memory 330, whereas tuples propagating to the left input can be temporarily stored in the left memory 320.

In order to allow inputs to a node to be logically linked or unlinked in a session, the link indicator 315 is used as described below. The link indicator 315 can be defined to have one of a set of predetermined values, which can be integers, vectors, strings of characters, etc. For instance, the link indicator of a beta node having two inputs can have one of four values, each value defined to represent a combination of the status of the two inputs. In one example, the four values can be: 0, 1, 2, and 3, where 0 represents both left and right inputs logically unlinked, 1 represents left input logically unlinked and right input logically linked, 2 represents left input logically linked and right input logically unlinked, and 3 represents both left and right inputs logically linked. In another example, the four values can be: (0, 0), (0, 1), (1, 0), and (1, 1), where (0, 0) represents both left and right inputs logically unlinked, (0, 1) represents left input logically unlinked and right input logically linked, (1, 0) represents left input logically linked and right input logically unlinked, and (1, 1) represents both left and right inputs logically linked. It should be apparent to one of skilled in the art to recognize that the link indicator 315 can be defined to be of other values, as long as these values can represent the different combinations of the status of the inputs of the node. Note that even when an input is logically unlinked in a session according to the link indicator 315, the input is treated in the session as if the input was physically unlinked, though the input is not physically unlinked. Therefore, other sessions sharing the same node would not have been affected by such logical unlinking of the input. Furthermore, because the input is logically unlinked, but not physically unlinked, it is possible to logically unlink both inputs to the node in a session without actually physically disconnecting the node from the network, unlike the conventional heuristic approach discussed above.

In some embodiments, each of the timestamps 317 is associated with a distinct input to the node. The timestamps 317 can be used to limit how often an input of the node is logically unlinked in order to reduce churn. One embodiment of a method to reduce churn caused by excessive unlinking is discussed in details below.

Referring back to FIG. 2, the rule engine can simultaneously process data in the sessions using the network (processing block 214). While processing data in one of the sessions, the rule engine can logically link and/or unlink inputs to nodes in the network by setting the link indicator in the respect node memory to an appropriate value (processing block 216). Some exemplary values of the link indicator have been discussed above. To further illustrate how inputs to a node can be logically linked and/or unlinked to improve performance and save memory, one embodiment of a method to logically link and/or unlink a beta node in a network shared by multiple sessions is discussed in details below with reference to FIG. 4.

In some embodiments, the rule engine usable to perform the above method comprises processing logic implemented with hardware (e.g., circuitry, dedicated logic, programmable logic, microcode, etc.), software (such as instructions run on a processing device), firmware, or a combination thereof. For example, the rule engine may be executable on a processing device running in a computing machine (e.g., a personal computer (PC), a server, a laptop computer, a tablet computer, a personal digital assistant (PDA), a smart phone, etc.). The processing device can include one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like. The computing machine may further include machine-readable storage medium (a.k.a. computer-readable storage medium) coupled to the processing device, to store data (e.g., the node memories) and/or instructions. The machine-readable storage medium may include one or more of a read-only memory (ROM), a flash memory, a dynamic random access memory (DRAM), a static random access memory (SRAM), etc. In addition, the computing machine may include other components, such as a network interface device, a video display unit (e.g., a liquid crystal display (LCD), a touch screen, a cathode ray tube (CRT), etc.), an alphanumeric input device (e.g., a keyboard, a touch screen, etc.), a cursor control device (e.g., a mouse, a joystick, a touch screen, etc.), a signal generation device (e.g., a speaker), etc.

Figure 4:
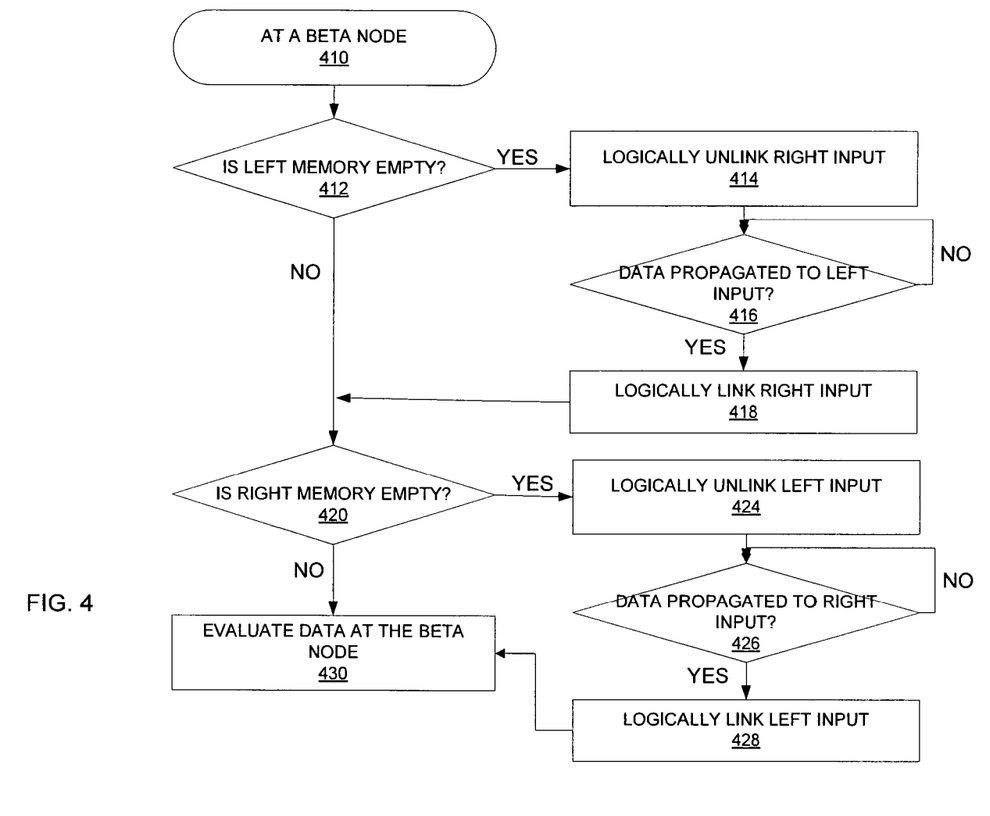
FIG. 4 illustrates one embodiment of a method to logically link and/or unlink a beta node in a network shared by multiple sessions.

FIG. 4 illustrates one embodiment of a method to logically link and/or unlink a beta node in a network shared by multiple sessions running on a rule engine. The method can be performed by a rule engine executable on a computing machine, such as the one described above. The process starts at a beta node in a particular session (processing block 410). As discussed earlier, a beta node has two inputs, namely, a left input and a right input, which are associated with a left memory and a right memory, respectively, in the beta node's node memory for the particular session. The rule engine first checks if the left memory is empty (processing block 412). If the left memory is non-empty, then the rule engine transitions to block 420. Otherwise, if the left memory is empty, then the rule engine logically unlinks the right input of the beta node (processing block 414). For example, the rule engine may logically unlink the right input by setting the link indicator of the beta node for the particular session to an appropriate value, indicating the right input being logically unlinked. Then the rule engine checks if any data has propagated to the left input (processing block 416). If none, then the rule engine stays in block 416. Otherwise, if there is data propagated to the left input, the rule engine logically links the right input back in (processing block 418), and then transitions to block 420.

At processing block 420, the rule engine checks if the right memory is empty. If the right memory is non-empty, then the rule engine transitions to block 430. Otherwise, if the right memory is empty, then the rule engine logically unlinks the left input of the beta node (processing block 424). For example, the rule engine may logically unlink the left input by setting the link indicator of the beta node for the particular session to an appropriate value indicative of the left input being logically unlinked. Then the rule engine checks if any data has propagated to the right input (processing block 426). If none, then the rule engine stays in block 426. Otherwise, if there is data propagated to the right input, the rule engine logically links the left input back in (processing block 428), and then transitions to block 430.

At processing block 420, the rule engine evaluates data at the beta node by attempting to join the one or more tuples in the left memory (which may be a tuple) with the one or more data objects in the right memory. If a data object can be joined with a tuple, then the resultant tuple is further propagated to an input of the next node connected to the beta node.

The above approach of logically linking and/or unlinking nodes saves computing resources because it avoids creating tuples that would just be discarded afterwards as there would be nothing to join with due to the opposite input being empty. However, the rule engine has to look up the node memory twice, once before propagating to the node and also inside of the node as it attempts to join a tuple with a data object at the node. Instead, in some embodiments, the node memory may be looked up once, prior to propagating and then passed as an argument, thus avoiding the double lookup.

In some embodiments, the rule engine does not have an alpha memory for an alpha node, unlike some conventional Rete network based rule engines. As such, facts may be pulled from an object type node into an alpha node. This means that facts may be needlessly evaluated in an alpha node in the network, only to be refused addition to the node memory of a beta node connected to the alpha afterwards if the right input of the beta node is unlinked. However, because multiple rules with similar constructs may use the same nodes in the network in some embodiments, these shared nodes cannot easily be unlinked, even logically. As a compromise, a lookahead approach may be adopted as discussed below.

Figure 5:
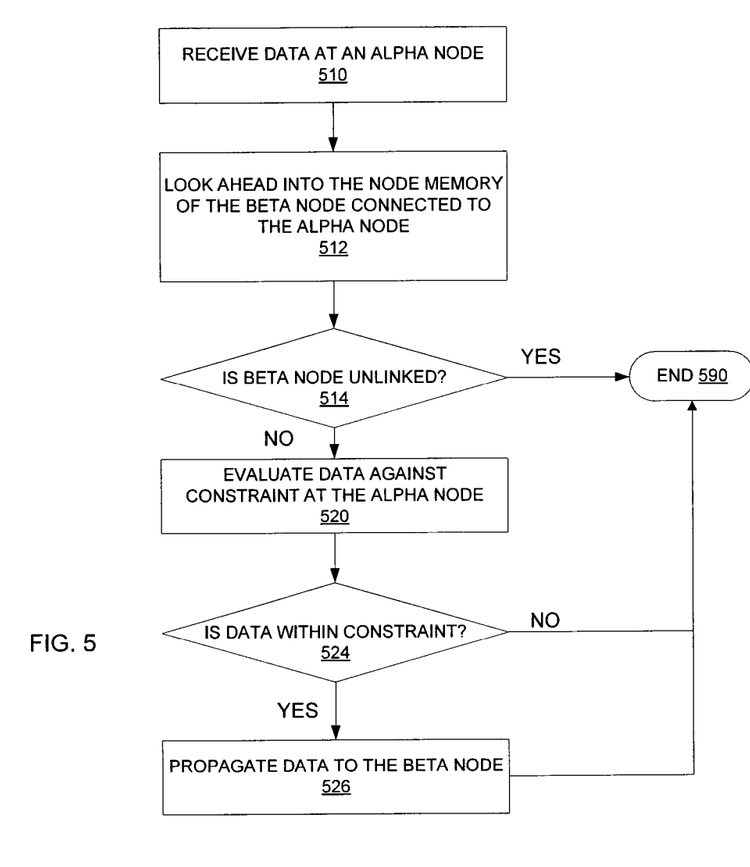
FIG. 5 illustrates one embodiment of a method to evaluate data against constraint in an alpha node.

FIG. 5 illustrates one embodiment of a method to evaluate data against constraint in an alpha node. The method can be performed by a rule engine executable on a computing machine, such as the one described above. The method starts at processing block 510, where the rule engine receives data at an alpha node of a network in a session. Then the rule engine looks ahead into the node memory of a beta node connected to the alpha node (processing block 512). Note that the alpha node and the beta node may be shared by multiple sessions running on the rule engine. By checking a link indicator in the node memory of the beta node, the rule engine determines if the beta node is logically unlinked (processing block 514). If at least one input of the beta node is logically unlinked, then the method ends at block 590. Note that there is no need to evaluate the data against the constraint in the alpha node in this situation because, even if the data meets the constraint and is propagated to the beta node, the beta node, being unlinked, cannot join the data anyway. Therefore, the rule engine can save resources by looking ahead into the beta node before evaluating data at the alpha node.

If both inputs to the beta node are linked, then the rule engine may evaluate the data against the constraint at the alpha node (processing block 520). Then the rule engine checks if the data is within the constraint (processing block 524). If not, then the method ends at block 590 because the data cannot be propagated to the beta node. Otherwise, the rule engine propagates the data to the beta node for further processing there (processing block 526), and then the method ends at block 590.

Figure 6:
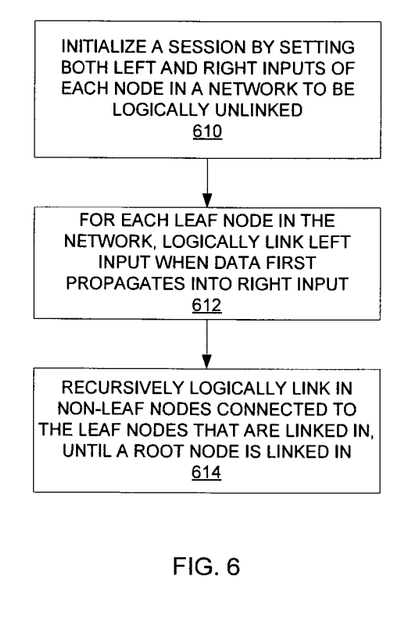
FIG. 6 illustrates one embodiment of a method to initialize a network in which left and right unlinking can be used simultaneously.

FIG. 6 illustrates one embodiment of a method to initialize a network in which left and right unlinking can be used simultaneously. The method can be performed by a rule engine executable on a computing machine, such as the one described above. The method starts at processing block 610, where the rule engine initializes a session by setting both left and right inputs of each node in the network to be logically unlinked. For instance, the rule engine may set a link indicator of each node to be a predetermined value indicating both left and right inputs being logically unlinked (e.g., (0, 0), 3, etc.). Note the network includes one or more leaf nodes, which are nodes not connected to any child node. Note that in this initial state, where both left and right inputs of each leaf node are unlinked, a right input of a leaf node is not just waiting for a propagation of a tuple into its left input so that the right input can be linked in (which cannot be done because the left is logically unlinked initially). The leaf node is also waiting for its first propagation of data into its right input, upon which it may logically link its left input in. Thus, for each leaf node in the network, the rule engine logically links a left input of the leaf node when data first propagates into a right input of the leaf node (processing block 612).

In some embodiments, the rule engine logically links in non-leaf nodes connected to the leaf nodes that have been linked in recursively, until a root node in the network is linked in (processing block 614). For example, upon logically linking in a left input of a leaf node, the rule engine may wait for a first propagation of data into a right input of a parent node of the leaf node, and when it occurs, the rule engine may logically link in a left input of the parent node. If the parent node already has a right propagation of data when the leaf node's left input is logically linked in, the rule engine may go ahead and logically link in the parent's left input in response to it. This may trickle up the network until the root node is finally logically linked in. Then data propagation can happen normally as discussed above and the rule engine can evaluate data against rules using the network with the nodes linked in.

Figure 7:
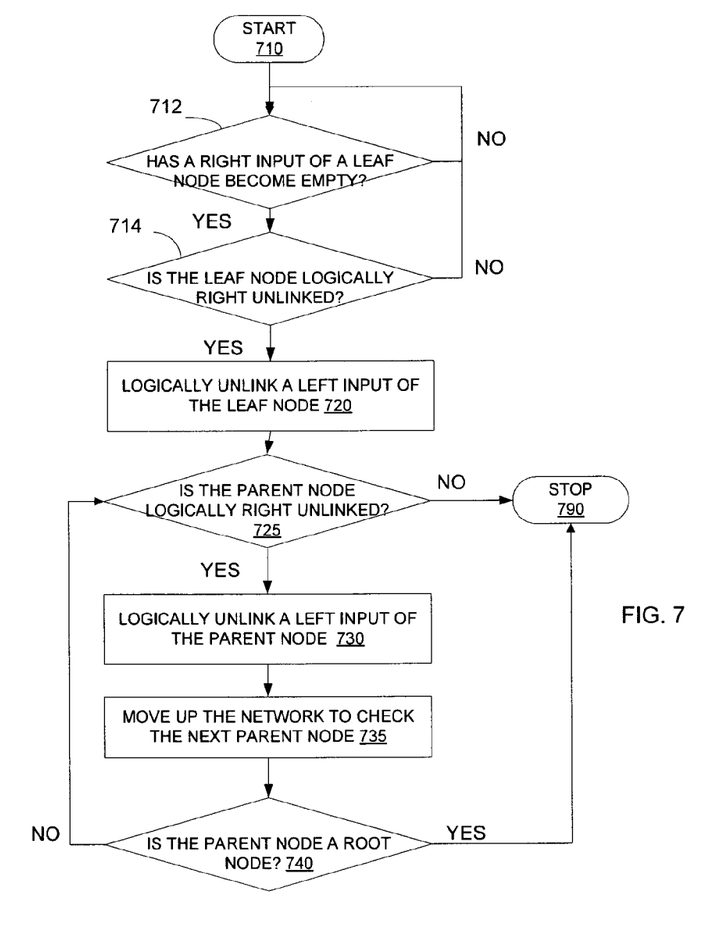
FIG. 7 illustrates one embodiment of a method to dynamically trim a network while processing data in the network.

In some embodiments, a rule engine may always eagerly propagate all join nodes, regardless of whether the child node can undertake joins too. For instance, if there is no propagation for a leaf node, then no rule can fire, and hence, the eager propagations are wasted. Logical unlinking can be extended to reduce eager propagations by dynamically trimming nodes from the network that would not have contributed to the firing of any rules. FIG. 7 illustrates one embodiment of a method to dynamically trim a network while processing data in the network. The method can be performed by a rule engine executable on a computing machine, such as the one described above. The method starts at processing block 710. The rule engine checks if a right input of a leaf node has become empty (processing block 712). If not, then the rule engine stays in block 712. Otherwise, the rule engine checks if the leaf node is logically right unlinked, i.e., the right input of the leaf node being logically unlinked (processing block 714). If not, then the rule engine returns to block 712. Otherwise, if the leaf node is logically right unlinked and the right input has also become empty, then the rule engine logically unlinks a left input of the leaf node (processing block 720).

After logically unlinking the left input of the leaf node, the rule engine moves up the network to check if a parent node of the leaf node is logically right unlinked (processing block 725). If not, then the rule engine stops the process at block 790. Otherwise, the rule engine logically unlinks a left input to the parent node (processing block 730). Then the rule engine moves up the network to the next parent node (processing block 735). The rule engine checks if the next parent node is a root node in the network (processing block 740). If it is a root node, then the rule engine stops the process at block 790. Otherwise, the rule engine returns to processing block 725 to repeat the above operations.

In sum, when a node has become both left and right logically unlinked, the rule engine may move up the network to unlink parent nodes of the node until it has reached a node that is both left and right linked in logically, or it has reached the root node. Thus, a portion of the network that would not contribute to the firing of any rules may be dynamically trimmed by logically unlinking the appropriate nodes. As a result, eager propagation can be reduced, and hence, resources can be saved.

As discussed above, adopting linking and unlinking in a rule engine can improve efficiency of the rule engine by saving time and computing resources. However, excessive linking and unlinking may create the opposite effect instead. Churn can occur in a rule engine when a node with a large amount of right input memory is substantially continually caused to be linked in and unlinked because the node has to be repeatedly populated. This can lead to a slow down of the rule engine.

Figure 8:
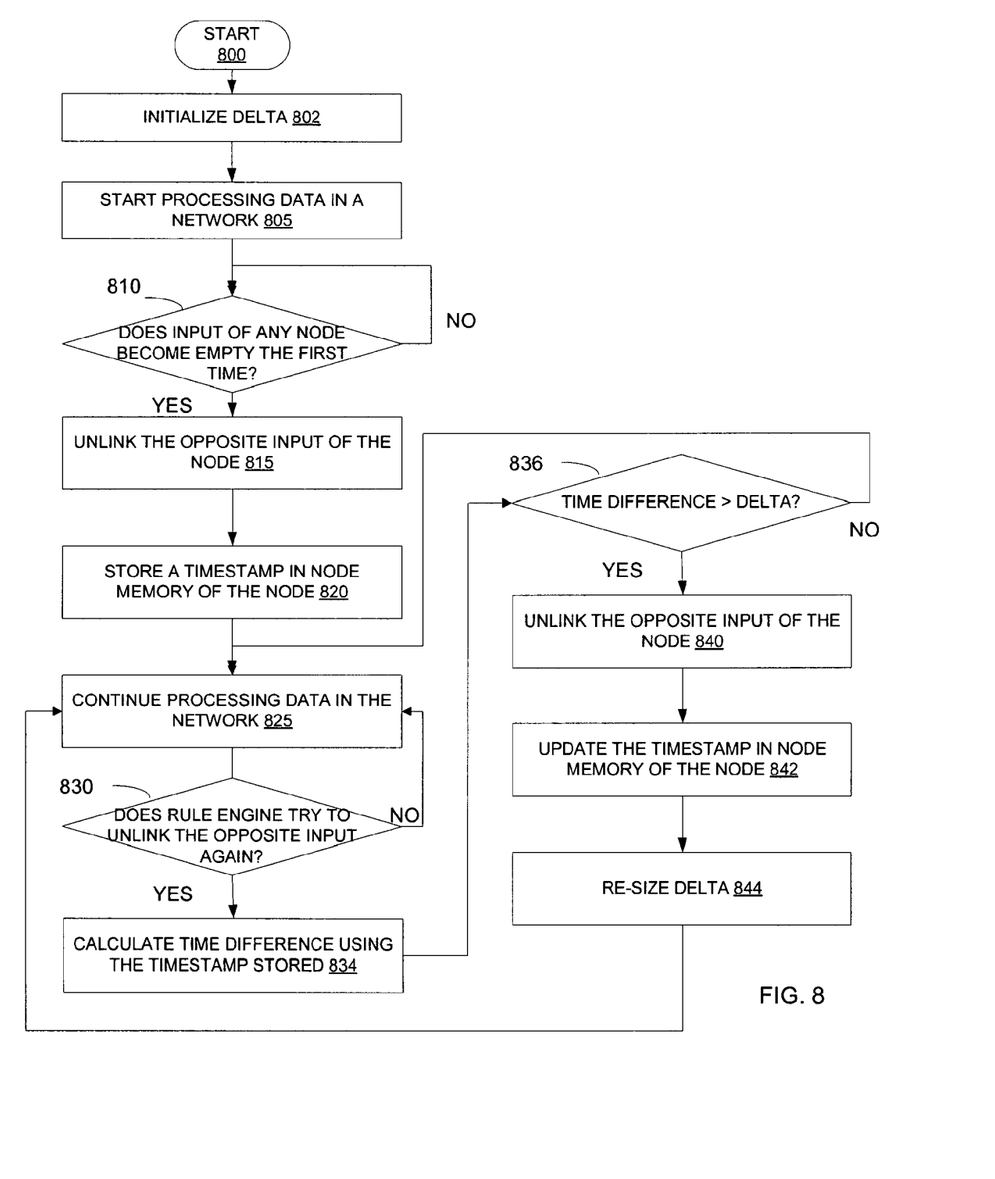
FIG. 8 illustrates one embodiment of a method to reduce churn from excessive unlinking.

FIG. 8 illustrates one embodiment of a method to reduce churn from excessive unlinking. The method can be performed by a rule engine executable on a computing machine, such as the one described above. The method starts a session at processing block 800. The rule engine initializes a parameter, delta (processing block 802). In some embodiments, delta is initialized to be a predetermined integer, such as 100. Then the rule engine starts processing data in a network, such as a Rete network, built according to a set of rules in a rule file (processing block 805). Details of some exemplary networks built and used by rule engines have been discussed above.

In some embodiments, the rule engine checks if an input of any node in the network becomes empty for the first time in the current session (processing block 810). If there is an input of a node becomes empty for the first time in the current session, then the rule engine unlinks the opposite input of the node (processing block 815) and then transition to block 820. For example, the rule engine may logically unlink the opposite input of the node by setting a node indicator in a node memory of the node to an appropriate value. Otherwise, the rule engine stays in block 810.

At block 820, the rule engine stores a timestamp in the node memory of the node, such as the timestamps 317 in the node memory 300 in FIG. 3. For example, the timestamp can be implemented with an integer counter for fact handles from a working memory of the rule engine. Then the rule engine continues processing data using the network (processing block 825), which may eventually link the input back. While processing data, the rule engine checks if it tries to unlink the opposite input of the node again (processing block 830). If not, then the rule engine returns to block 825 to continue processing data in the network.

In some embodiments, if the rule engine tries to unlink the opposite input of the node again, then the rule engine calculates a time difference between the current time and the last time the opposite input was unlinked using the timestamp stored in the node memory (processing block 834). Then the rule engine checks if the time difference is greater than delta (processing block 836). If the time difference is not greater than delta, then the rule engine does not unlink the opposite input again and returns to block 825 to continue processing data using the network. If the time difference is greater than delta, then the rule engine unlinks the opposite input of the node (processing block 840). The rule engine may further update the timestamp in the node memory (processing block 842). In some embodiments, the rule engine re-sizes delta based on some predetermined policies (processing block 844). For example, the rule engine may increase delta by a predetermined factor (e.g., 2 times, 3 times, etc.) such that the rule engine will have to wait longer to unlink the same input the next time. Furthermore, the rule engine may impose a maximum limit on delta such that the rule engine may stop increasing delta once delta reaches or exceeds the maximum limit. After re-sizing delta, the rule engine returns to block 825 to continue processing data using the network.

By waiting at least a certain period of time before unlinking the same input again, it is more likely that a certain number of data objects have propagated into the input between the two times the input is unlinked. This technique helps to reduce churn, which is when a node with a large amount of right input memory is substantially continually caused to be linked in and unlinked, forcing the node to be repeatedly populated and leading to a slow down of the rule engine.

Figure 9:
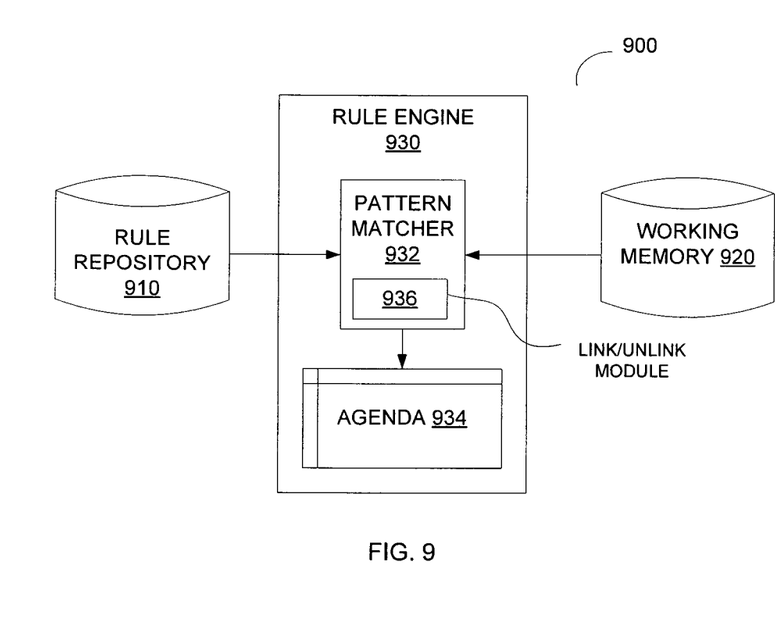
FIG. 9 shows one embodiment of a rule engine usable with some embodiments of the present invention.

FIG. 9 shows one embodiment of a rule engine usable to implement left and right unlinking for a shared knowledge base. In some embodiments, a rule engine 930 is operatively coupled to a rule repository 910 and a working memory 920. The rule repository 910 stores a rule set having a number of rules. The rule repository 910 may also be referred to as a production memory. The working memory 820 stores data objects (also referred to as facts) that have been asserted.

In some embodiments, the rule engine 930 includes a pattern matcher 932 and an agenda 934. The pattern matcher 932 generates network (such as a Rete network) to evaluate the rules from the rule repository 910 against the data objects from the working memory 920. One or more of the nodes within the network are multiple-input nodes, such as a beta node. A link/unlink module 936 within the pattern matcher 932 logically links and/or unlinks the nodes in the network based on whether there is data in the respective node memories in order to save resources (e.g., computing power and memory) and to improve speed. Details of some examples of implementing linking and unlinking in a rule engine have been described above.

As the data objects propagating through the network, the pattern matcher 932 evaluates the data objects against the rules. Fully matched rules result in activations, which are placed into the agenda 934. The rule engine 930 may iterate through the agenda 934 to execute or fire the activations sequentially. Alternatively, the rule engine 930 may execute or fire the activations in the agenda 934 randomly.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description above. In addition, the present invention is not described with reference to any particular programming language. It will be appreciated that a variety of programming languages may be used to implement the teachings of the invention as described herein.

Thus, some embodiments of linking and unlinking for a shared knowledge base in a rule engine have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:

creating, by a processing device, a network to evaluate a plurality of rules in a knowledge base, the network comprising a plurality of nodes;

processing, by the processing device, data in a plurality of sessions simultaneously using the network; and logically unlinking, by the processing device, a first node in the network from a second node in the network for a first one of the plurality of sessions while keeping the first node linked to the second node for a second one of the plurality of sessions.

2. The method of claim 1, further comprising:

storing a plurality of node memories for each of the plurality of sessions in a data storage device, each of the plurality of node memories corresponding to a distinct one of the plurality of nodes of the network, wherein each of the plurality of node memories comprises a right memory, a left memory, and a link indicator.

3. The method of claim 1, further comprising:
maintaining, by the processing device, a link indicator for each of the plurality of nodes in each of the plurality of sessions, wherein the link indicator has four possible values, a first one of the four possible values indicating a respective node being left linked and right linked, a second one of the four possible values indicating the respective node being left linked and right unlinked, a third one of the four possible values indicating the respective node being left unlinked and right linked, and a fourth one of the four possible values indicating the respective node being left unlinked and right unlinked.

4. The method of claim 1, wherein the processing device logically unlinks a right input of the first node when a left input of the first node becomes empty, and the processing device logically unlinks the left input of the first node when the right input of the first node becomes empty.

5. The method of claim 1, further comprising:
sharing, by the processing device, an alpha node in the network between the plurality of sessions, wherein an output of the alpha node is connected to an input of a beta node in the network;
checking, by the processing device, a node memory of the beta node to determine if the beta node is logically unlinked; and
evaluating, by the processing device, data at the alpha node if the beta node is not logically unlinked.

6. The method of claim 1, wherein the plurality of rules comprise a plurality of business rules.

7. The method of claim 1, wherein the network comprises a Rete network.

8. An apparatus comprising:
a first storage device to store a plurality of rules in a knowledge base; and
a processing device coupled to the storage device, to create a network, comprising a plurality of nodes, to evaluate the plurality of rules, to process data in a plurality of sessions simultaneously using the network, and to logically unlink a first node in the network from a second node in the network for a first one of the plurality of sessions while keeping the first node linked to the second node for a second one of the plurality of sessions.

9. The apparatus of claim 8, further comprising:
a second storage device to store a plurality of node memories for each of the plurality of sessions in a data storage device, each of the plurality of node memories corresponding to a distinct one of the plurality of nodes of the network, wherein each of the plurality of node memories comprises a right memory, a left memory, and a link indicator.

10. The apparatus of claim 8, wherein the processing device maintains a link indicator for each of the plurality of nodes in each of the plurality of sessions, wherein the link indicator has four possible values, a first one of the four possible values indicating a respective node being left linked and right linked, a second one of the four possible values indicating the respective node being left linked and right unlinked, a third one of the four possible values indicating the respective node being left unlinked and right linked, and a fourth one of the four possible values indicating the respective node being left unlinked and right unlinked.

11. The apparatus of claim 8, wherein the processing device logically unlinks a right input of the first node when a left input of the first node becomes empty, and the processing device logically unlinks the left input of the first node when the right input of the first node becomes empty.

12. The apparatus of claim 8, wherein the processing device shares an alpha node in the network between the plurality of sessions, wherein an output of the alpha node is connected to an input of a beta node in the network, checks a node memory of the beta node to determine if the beta node is logically unlinked, and evaluates data at the alpha node if the beta node is not logically unlinked.

13. The apparatus of claim 8, wherein the plurality of rules comprise a plurality of business rules.

14. The apparatus of claim 8, wherein the network comprises a Rete network.

15. A non-transitory computer-readable storage medium comprising instructions that, when executed by a processing device, cause the processing device to perform operations comprising:
creating, by the processing device, a network to evaluate a plurality of rules in a knowledge base, the network comprising a plurality of nodes;
processing, by the processing device, data in a plurality of sessions simultaneously using the network; and
logically, by the processing device, unlinking a first node in the network from a second node in the network for a first one of the plurality of sessions while keeping the first node linked to the second node for a second one of the plurality of sessions.

16. The non-transitory computer-readable storage medium of claim 15, wherein the operations further comprise:
storing a plurality of node memories for each of the plurality of sessions in a data storage device, each of the plurality of node memories corresponding to a distinct one of the plurality of nodes of the network, wherein each of the plurality of node memories comprises a right memory, a left memory, and a link indicator.

17. The non-transitory computer-readable storage medium of claim 15, wherein the operations further comprise:
maintaining a link indicator for each of the plurality of nodes in each of the plurality of sessions, wherein the link indicator has four possible values, a first one of the four possible values indicating a respective node being left linked and right linked, a second one of the four possible values indicating the respective node being left linked and right unlinked, a third one of the four possible values indicating the respective node being left unlinked and right linked, and a fourth one of the four possible values indicating the respective node being left unlinked and right unlinked.

18. The non-transitory computer-readable storage medium of claim 15, wherein the processing device logically unlinks a right input of the first node when a left input of the first node becomes empty, and the processing device logically unlinks the left input of the first node when the right input of the first node becomes empty.

19. The non-transitory computer-readable storage medium of claim 15, wherein the operations further comprise:
sharing an alpha node in the network between the plurality of sessions, wherein an output of the alpha node is connected to an input of a beta node in the network; checking a node memory of the beta node to determine if the beta node is logically unlinked; and evaluating data at the alpha node if the beta node is not logically unlinked.

20. The non-transitory computer-readable storage medium of claim 15, wherein the plurality of rules comprise a plurality of business rules.

21. The non-transitory computer-readable storage medium of claim 15, wherein the network comprises a Rete network.

\* \* \* \* \*